UNITED STATES PATENT OFFICE.

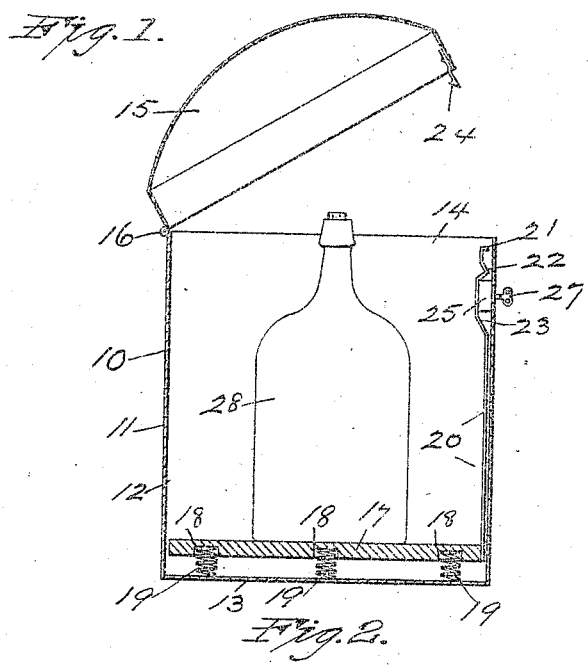
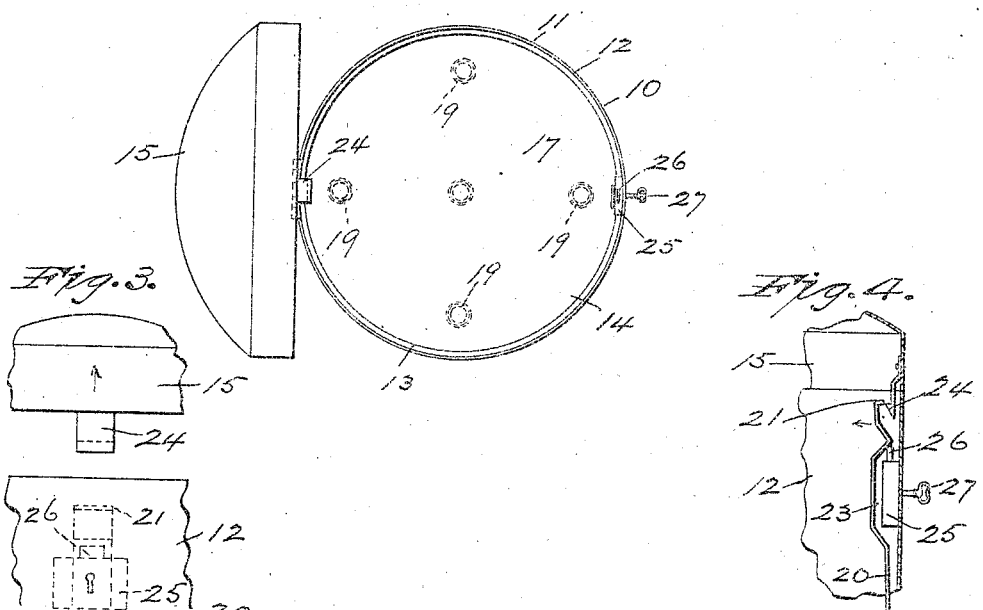

EDWARD F. FARLEY, OF NEW YORK, N. Y.

BOTTLE-HOLDER.

1,008,709.

Specification of Letters Patent.  Patented Nov. 14, 1911.

Application filed March 25, 1911. Serial No. 616,867.

*To all whom it may concern:*

Be it known that I, EDWARD F. FARLEY, a citizen of the United States, and a resident of New York, borough of Brooklyn, county of Kings, and State of New York, have invented certain new and useful Improvements in Bottle-Holders, of which the following is a full, clear, and exact specification.

This invention relates to a class of devices or holders adapted for use more particularly to safely retain bottles, or the like, which contain poisons.

My invention has for its object primarily to provide a holder or device in which a bottle, or other receptacle, containing poisonous liquid or injurious substance may be safely kept whereby accidental use of the liquid or substance will be positively prevented, or which will serve as a timely warning to persons of the danger liable to result from improper use of the contents of the bottle or receptacle, and this is accomplished mainly by providing a holder which is capable of being locked by the weight of the bottle or receptacle when placed therein and which will require the employment of a key to unlock the holder, in order to extract the bottle therefrom.

A further object of the invention is to provide a simple, durable and efficient form of holder which is susceptible of being made in various sizes either in ornamental or plain designs.

A practical embodiment of the invention is represented in the accompanying drawing forming a part of this specification in which similar characters of reference indicate corresponding parts in all the views, the said invention being more fully described hereinafter and then pointed out in the appended claim.

In the drawing, Figure 1, is a transverse vertical section of one form of improved bottle holder embodying my invention. Fig. 2 is a top plan of the holder showing the lid thereof in an open position. Fig. 3 illustrates fragmentary views of one form of means employed for locking the lid to the receptacle, and Fig. 4 is a fragmentary sectional view, partly in detail, of the locking means.

The device or bottle holder 10 may be made mainly of any suitable metal, or other material, in any desired size so as to adapt it to receive bottles or containers of various sizes. The holder 10 is composed of a body or receptacle 11 having an annular wall 12, a bottom plate 13, and an open top, as 14. A lid, as 15, is provided for closing the open top 14 of the receptacle 11, and said lid is pivotally held as by a hinge 16, to one part of the edge of the annular wall 12 at the open top thereof. Within the receptacle 11 is a resiliently held plate or cushion 17 which is preferably circular in shape, and is less in diameter than the interior of said receptacle so as to be moved freely therein. In the under surface of the movable plate 17 is formed a plurality of recesses, as 18, and in each of said recesses is seated an end of a plurality of springs 19 normally serving to force said movable plate toward the open top 14 of the receptacle. Each of the springs 19 has its opposite end resting upon or held to the bottom plate 13 of the receptacle, and said springs are of sufficient length to permit the resiliently held plate 17 to be spaced but a short distance from said bottom plate.

As a means to lock the lid 15 when closed upon the receptacle 11, upon the edge of the cushion or resiliently held plate 17 is held one end of a rod 20 which is preferably of spring metal. The spring rod 20 extends upwardly adjacent to and parallel with the wall 12 of the receptacle 11, and terminates with a bent end or catch 21 in proximity to the top opening 14. The upper part of the spring rod 20 adjacent to the catch 21 is bent so as to provide a substantially V-shaped portion 22 having its apex extending so as to be close to the contiguous part of the annular wall 12 of the receptacle. At one end of the V-shaped extension 22 of the spring rod 20 is an oppositely bent portion of said rod whereby a recess 23 is formed therein. Upon the edge of the lid 15 opposite to the hinge 16 is provided a clip 24 which is in the path of movement of the catch 21 of the rod 20 so that said clip will engage the catch when the lid 15 is closed upon the receptacle 11.

To disengage the catch 21 from the clip 24 for opening the lid 15 from the receptacle 11, I provide a lock 25 having a bolt 26 of the usual or any preferred type. The lock 25 is adapted to be operated by any suitable key, as 27. The holder or device 10 may be placed in any desired place or fastened by any preferred means to a suitable support, and when poisonous or injurious substance is placed in said holder for safe keeping the lid 15 is swung open and a bottle, as 28, containing the substance is passed into the receptacle 11. The weight of the bottle 28 will force the movable plate 17 against the tension of the springs 19 and in turn the rod 20 will be directed so as to force the catch 21 toward the bottom of the receptacle. The lid 15 is then closed upon the open top 14 of the receptacle 11, and the clip 24 will engage the catch 21 for locking said lid against displacement. When it is desired to gain access to the interior of the holder the key 27 is moved so that the bolt 26 of the lock 25 will engage the apex of the V-shaped portion 22 of the spring rod 20, and will force said rod in a direction to unlock the catch 21 from the clip 24 whereby the lid 15 may be swung open so that the bottle 28 may be extracted from the holder.

In the foregoing description I have embodied the preferred form of my invention, but I do not wish to be understood as limiting myself thereto, as I am aware that modifications may be made therein without departing from the principle or sacrificing any of the advantages of this invention; therefore I reserve to myself the right to make such changes as fairly fall within the scope thereof.

Having thus described my invention, I claim as new and desire to secure by Letters Patent:—

A bottle holder of the character described, comprising a receptacle having a bottom and an open top; a lid hinged to the receptacle and adapted to close the open top thereof; a clip provided upon the lid; a movable plate provided within the receptacle and resiliently held to the bottom thereof; a spring rod having one end held to the movable plate and having its opposite end bent so as to engage the clip of the lid when said lid is closed upon the receptacle; a V-shaped projection provided upon the spring rod adjacent to the bent end thereof; a lock provided upon the receptacle and having a bolt, said bolt being adapted when the lock is operated to engage the V-shaped projection of the spring rod whereby the beet end of said spring rod may be forced from engagement with the clip of the lid.

This specification signed and witnessed this twenty-fourth day of March A. D. 1911.

EDWARD F. FARLEY.

Witnesses:
ROBT. B. ABBOTT,
E. M. JERKE.